Patented July 12, 1932

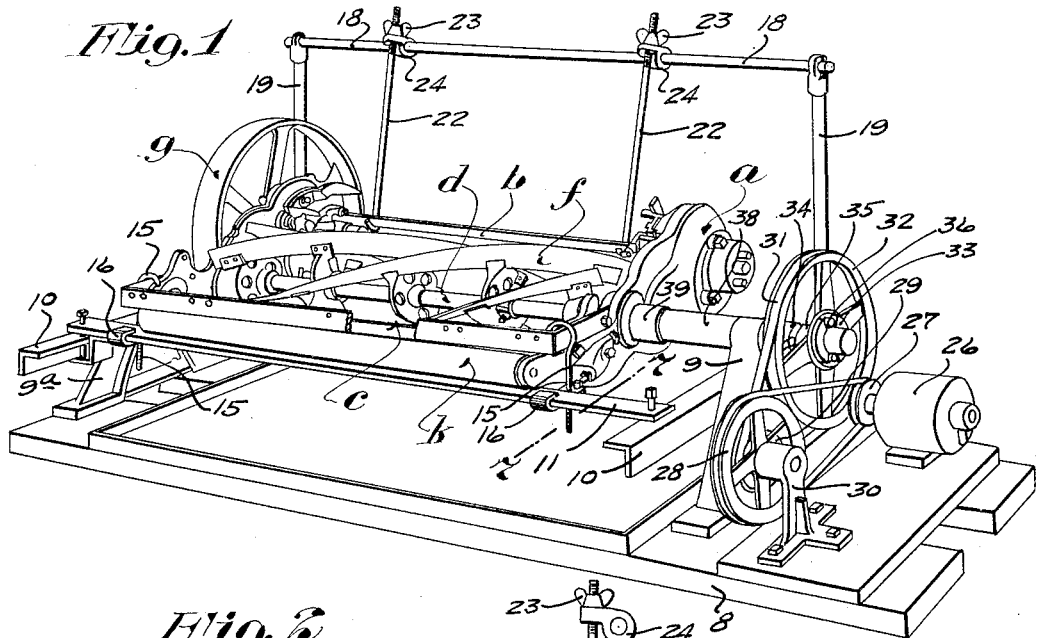
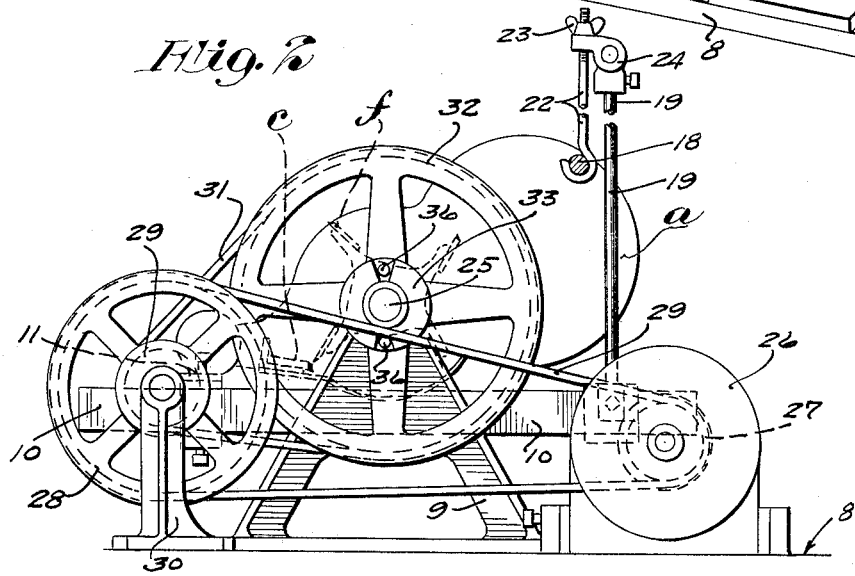
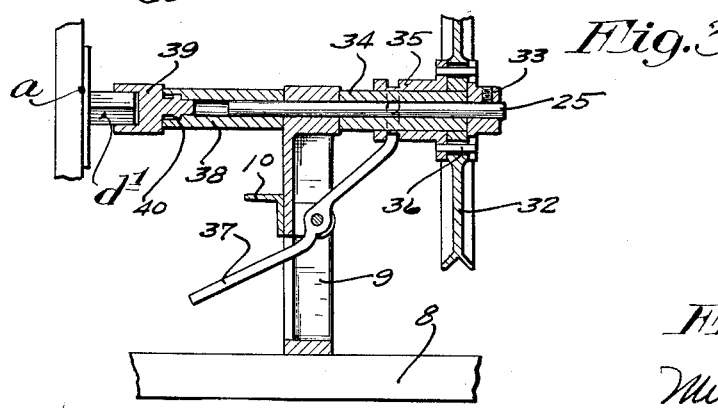

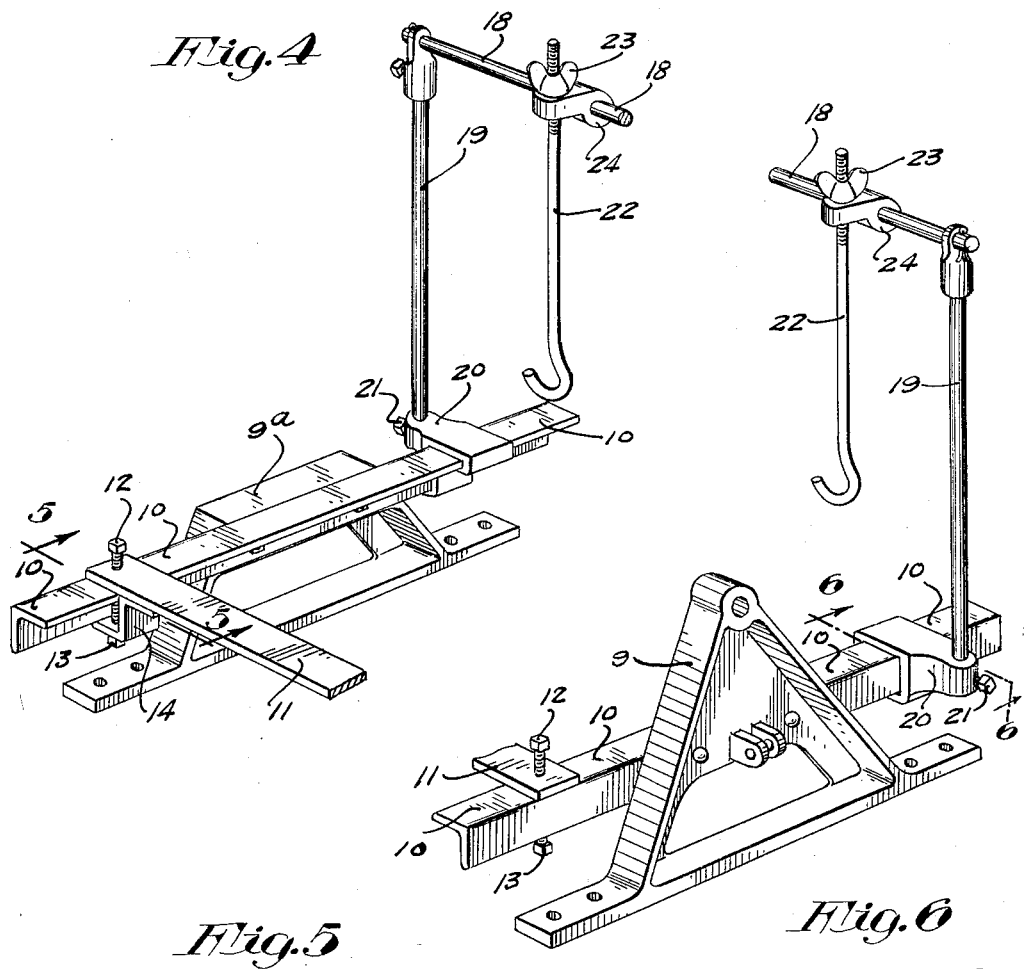

1,866,794

UNITED STATES PATENT OFFICE

FRANK H. BIERMAN, OF MINNEAPOLIS, MINNESOTA

LAWN MOWER SHARPENING MACHINE

Application filed June 18, 1931. Serial No. 545,189.

My present invention relates to lawn mower sharpening machines and is in the nature of an improvement on the machine disclosed and claimed in my prior Patent No. 1,444,100, issued of date February 6, 1923. The machine of my prior patent and the machine of the present application are of the type wherein the major portions of the lawn mower with the rotary cutter head and co-operating relatively fixed cutter bar in operative association are placed in the machine and sharpened while maintained in such co-operative relation. The prior machine, however, was so designed that it could be used in sharpening lawn mowers having their driving connections at the same side; or otherwise stated, if the machine was designed to receive and sharpen lawn mowers having left-hand drives, then it was not adapted for use in sharpening lawn mowers having a right-hand drive. The important departure from or addition to the mechanism of the prior machine consists in a provision and arrangement whereby lawn mowers may be applied in the machine and sharpened regardless of whether they are provided with right or left-hand drives; and this, generally stated, is accomplished by a forward and rearward extension and interchangeability of certain of the guiding and supporting devices, all as will hereinafter more fully appear in the description of the drawings, wherein the improved machine is illustrated and wherein like characters indicate like parts throughout the several views.

Referring to the drawings:

Fig. 1 is a perspective showing the improved sharpening machine and a lawn mower applied therein and positioned to be sharpened;

Fig. 2 is a right side elevation of the machine, some parts being broken away and some parts sectioned;

Fig. 3 is a fragmentary view chiefly in section on the line 3—3 of Fig. 1;

Fig. 4 is a fragmentary perspective with some parts broken away showing portions of the supporting base and shiftable or interchangeable supporting devices thereon;

Fig. 5 is a detail in section on the line 5—5 of Fig. 4;

Fig. 6 is a detail in section on the line 6—6 of Fig. 4; and

Fig. 7 is a detail in section taken on the line 7—7 of Fig. 1.

Of the parts of the lawn mower illustrated, which is of ordinary well-known construction, the main elements are the laterally spaced gear housings $a$, the connecting rod $b$, the cutter bar $c$, the cutter shaft $d$, the blades $f$, the wheels $g$ and the roller $k$. In Fig. 1, one of the wheels $g$ is removed and an angular projecting end $d'$ of cutter shaft $d$ is exposed.

The machine comprises a suitable base 8 that may be supported on a bench or by legs or any other suitable way so far as this invention is concerned. Rigidly secured on this base are upstanding laterally spaced rail-supporting brackets 9 and $9^a$, that rigidly support laterally spaced horizontal parallel rails 10, shown as in the form of angle irons. As an important feature, these rails 10 extend considerable distances both forward and rearward of the brackets 9 and $9^a$ by which they are supported, directions as in respect to front and rear being taken in respect to Figs. 1, 2 and 4.

The numeral 11 indicates a transverse rest bar, preferably a flat steel bar, provided at its ends with couplings adjustably securing the same to the projecting ends of rails 10, the same in Fig. 1 being shown as applied to the front ends of said rails. These coupling devices, as shown, comprise opposing set screws 12 and 13, the former having screw-threaded engagement through the ends of said rest bar, and the latter being threaded through the ends of angle brackets 14, which, in turn, are rigidly secured to the ends of said bar 11 and depend therefrom, as best shown in Fig. 5. By these coupling devices, the bar 11 is arranged to be rigidly secured to the rails, but with freedom for vertical forward and rearward adjustments and for complete removal. By means of clamps such as hook rods 15, hooked over the rear portion of the framework of the lawn mower, the lawn mower is arranged to be clamped with its roller $k$ resting on the rest bar 11. These hook rods 15 as best shown in Figs. 1 and 7 are directly passed through perforations in metallic anchoring clips 16 that are bent so that they will hook over the bar 11; and for tightening the hook rods onto the lawn mower, they are provided with nuts 17. The hook rods are thus secured to the rest bar 11 with freedom for lateral adjustments to adapt themselves to the width of the lawn mower and for vertical adjustments to clamp the lawn mower with its roller $k$ upon the rest bar 11.

At the rear of the machine, directions again being taken in respect to Figs. 1, 2 and 4, there is an elevated transverse hanger bar 18, shown as in the form of a rod, the ends of which are anchored to the upper ends or heads of posts 19, the lower ends of which latter are passed through clamps in the form of castings 20 provided with outstanding lugs through which the lower ends of the posts 19 are inserted. These posts are made vertically adjustable by set screws 21 applied to the outstanding lug portions of the castings 20 and obviously, said castings may be slid forwardly and rearwardly on the rails to properly position the hanger bar 18. For supporting that portion of the lawn mower which in Fig. 1 is at the rear of the machine, quite long hook rods 22 are provided. The hook ends of these hook rods 22 are adapted to be hooked under the cross-rod $b$ of the lawn mower, and their threaded upper ends which are provided with nuts 23 are passed through heads 24 that are laterally slidable upon the hanger bar 18.

For driving the cutter head of the lawn mower in sharpening action, a driving shaft 25, see particularly Figs. 1 and 3, is journaled in the upper portion of the rail-supporting bracket 9. The shaft 25 is driven from a small electric motor 26 applied on the base 8, preferably through the following connections, to wit:

The rotor shaft of motor 26 is provided with a small pulley 27 that drives a larger pulley 28 through a belt 29. Pulley 28 is secured to a smaller pulley 29 and both of said pulleys 28 and 29 are journaled to the pedestal bracket 30 rigidly secured on the base 8. Pulley 29 through a belt 31, drives a larger pulley 32 which, as shown, is journaled on the outer end of shaft 25. As shown, the outer end of shaft 25 has a rigidly secured clutch hub or member 33 and, as shown, pulley 32 is directly mounted on a spacing sleeve 34 and mounted on the said spacing sleeve is a clutch collar 35 that carries pins 36 normally passed through perforations in the hub of pulley 32 and adapted to be engaged with notches or perforations in the clutch hub 33, to connect the shaft 25 for rotation with pulley 32. Clutch collar 35 is shown as arranged to be manually moved into operative or inoperative position by a lever 37 pivoted to bracket 9. A sleeve 38 is pinned, keyed or otherwise rigidly secured to the inner end of shaft 25 and to the inner end of said sleeve, a clutch collar 39 is applied. This clutch collar has lugs 40 that telescopically engage the grooves in the ends of said sleeve and detachably hold said clutch socket for rotation with said sleeve and with the shaft 25. Socket 39 is arranged to be telescoped onto the angular end $d'$ of cutter shaft $d$ of the lawn mower. The purpose of making the clutch socket 39 detachable is to permit interchangeable use of sockets having different sized recesses for engagement with shanks $d'$ of different size.

The lawn mower shown in Fig. 1 is provided with what may be designated as a right-hand drive so that the shank $d'$ of cutter shaft $d$ is exposed at the right-hand side of the lawn mower. A lawn mower with this kind of a drive may be secured on the machine, as already described, and in a position shown in Fig. 1 and in such position it is adapted to be coupled to and driven from the driving mechanism of the machine.

If the machine is to be used for sharpening a lawn mower having a left-hand drive, then the rest bar 11 and the hanger bar 18 and supporting posts should be interchanged in position, that is, the rest bar should be applied to the rear ends of rails 10 and the posts 19 should be applied to the front ends of said rails. The lawn mower with the left-hand drive then being turned around and presented from what is treated as the rear of the machine, may be supported in the same manner as illustrated in the drawings but in reverse arrangement, and its angular shank $d'$ will be then presented in proper position for coupling to the clutch socket 39. To facilitate this reverse sharpening action, means for reversing the direction of rotation of shaft 25 should be provided and this may be accomplished in any suitable way but preferably by the use of a reversible motor 36.

As is well known, the sharpening action of the blades $f$ will be produced by rotating the same against the cutter bar $c$ when an abrasive material such as pulverized carborundum or pumice stone is applied to said cutter bar.

In actual practice, this machine has been found highly efficient for sharpening lawn mowers regardless of whether they are provided with right-hand or left-hand drives.

What I claim is:

1. A machine for sharpening lawn mowers comprising laterally spaced supports, means applied to one of said supports for rotating the cutter head of a lawn mower, laterally spaced rails secured in respect to said supports and extending both forward and rearward thereof, a rest bar for the roller-equipped extension of the lawn mower adjustably applied to said rails and shiftable from the front to the rear end portions thereof, and clamping means applied to said rest bar for clamping the lawn mower against said bar in both forwardly and rearwardly applied positions, whereby the machine is arranged to hold and sharpen lawn mowers regardless of whether they have right- or left-hand drives.

2. A machine for sharpening lawn mowers comprising laterally spaced supports, means applied to one of said supports for rotating the cutter head of a lawn mower, laterally spaced rails secured in respect to said supports and extending both forwardly and rearwardly thereof, a rest bar for the roller-equipped extension of the lawn mower, adjustably applied to the said rails and shiftable from front to the rear end portions thereof, an overhead support, an upstanding transversely extended hanger frame adjustably applied to said rails and shiftable from front to rear thereof and provided with a depending hanger rod for engagement with the cross rod of a lawn mower, said hanger frame and rest bar being applied to opposite ends of said rails but interchangeably applicable thereto in respect to front and rear, whereby the machine is arranged to hold and sharpen lawn mowers regardless of whether they have right or left drives.

3. The structure defined in claim 1 in which said rest bar is provided with means for setting the same in different vertical adjustments.

4. The structure defined in claim 2 in which said rest bar is provided with means for setting the same in different vertical adjustments and in which there are two hanger rods that are independently vertically adjustable.

5. The structure defined in claim 1 in which the clamping means on said rest bar is laterally adjustable for different widths of lawn mowers.

6. The structure defined in claim 2 in which the clamping means on said rest bar and the hanger rods on said hanger frame are in duplicate and are laterally adjustable for different widths of lawn mowers.

7. A machine for sharpening lawn mowers comprising laterally spaced supports, means applied to one of said supports for rotating the cutter head of a lawn mower, laterally spaced rails secured in respect to said supports and extending both forward and rearward thereof, rest means co-operating with both the forward and rearward extensions of said rails to position and support the roller-equipped extension of the lawn mower, whereby the machine is arranged to hold and sharpen lawn mowers regardless of whether they are right or left-hand drives.

In testimony whereof I affix my signature.

FRANK H. BIERMAN.